(12) United States Patent
Zhang et al.

(10) Patent No.: US 8,089,249 B2
(45) Date of Patent: Jan. 3, 2012

(54) BATTERY MANAGEMENT SYSTEMS AND METHODS

(75) Inventors: Wei Zhang, Shanghai (CN); Guoxing Li, Sunnyvale, CA (US); Jiulian Dai, Shanghai (CN); Lei Wang, Shanghai (CN); Wenhua Cui, Shanghai (CN)

(73) Assignee: O2Micro, Inc., Santa Clara, CA (US)

( * ) Notice: Subject to any disclaimer, the term of this patent is extended or adjusted under 35 U.S.C. 154(b) by 0 days.

(21) Appl. No.: 12/941,365

(22) Filed: Nov. 8, 2010

(65) Prior Publication Data

US 2011/0121645 A1 May 26, 2011

(51) Int. Cl.
*H02J 7/00* (2006.01)
(52) U.S. Cl. ......... 320/119; 320/116; 320/118; 320/121
(58) Field of Classification Search .................. 320/103, 320/116, 117, 118, 119, 120, 121, 122, 123, 320/132, 134, 152, 157, 162
See application file for complete search history.

(56) References Cited

U.S. PATENT DOCUMENTS

| | | | | |
|---|---|---|---|---|
| 7,880,434 B2* | 2/2011 | White et al. | ................... | 320/119 |
| 2006/0043934 A1* | 3/2006 | Sugimoto | ..................... | 320/132 |
| 2008/0272739 A1* | 11/2008 | Carrier et al. | ................. | 320/134 |
| 2009/0039830 A1* | 2/2009 | Pellenc | .......................... | 320/116 |
| 2010/0327807 A1* | 12/2010 | Kikinis et al. | ................. | 320/116 |

* cited by examiner

*Primary Examiner* — M'Baye Diao (57) ABSTRACT

A battery management system includes a switch array, a first controller and a second controller. The switch array selects a battery module from multiple battery modules in a battery pack based upon a conduction state of the switch array. The first controller is coupled to the switch array and receives measurement information of cells in the battery pack through the switch array. The second controller is coupled to the switch array and the first controller and provides a control signal to control the conduction state of the switch array. The first controller further controls a balance circuit coupled to the battery pack to balance a selected battery module if the selected battery module is identified as an unbalanced battery module based upon measurement information associated with the selected battery module.

20 Claims, 9 Drawing Sheets

BATTERY MANAGEMENT SYSTEMS AND METHODS

BACKGROUND

Demand for electronic devices has been expanding, which impels a fast development of battery packs, e.g., rechargeable battery packs. There are various types of battery packs, such as Lithium-Ion battery and Lead-Acid battery. A battery pack can include multiple series-coupled battery modules, each of which further includes multiple cells and two electric terminals. A module voltage across each battery module can be monitored via these two electric terminals. The battery module is problematic if the battery module contains one or more defective cells. Accordingly, the whole battery pack can be affected adversely. In addition, if there is unbalance between any two of the cells within the battery module, aging process of the battery pack is accelerated, and therefore the lifetime of the battery pack is shortened.

A conventional solution to the problem is to allocate multiple controllers respectively to the multiple battery modules. Each controller specifically monitors a corresponding battery module. Each controller monitors each cell within the corresponding battery module and controls corresponding balance circuits to balance the cells within the corresponding battery module. As such, balance between the multiple battery modules in the battery pack is achieved by using the multiple controllers. Because each battery module is allocated with a corresponding controller, the number of the controllers increases accordingly as the number of the battery modules in the battery pack increases. As such, the cost of the battery management system is increased.

SUMMARY

In one embodiment, a battery management system includes a switch array, a first controller and a second controller. The switch array selects a battery module from multiple battery modules in a battery pack based upon a conduction state of the switch array. The first controller is coupled to the switch array and receives measurement information of cells in the battery pack through the switch array. The second controller is coupled to the switch array and the first controller and provides a control signal to control the conduction state of the switch array. The first controller further controls a balance circuit coupled to the battery pack to balance selected battery module when the selected battery module is identified as an unbalanced battery module based upon measurement information associated with the selected battery module.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present disclosure provide a battery management system. The battery management system includes a switch array, a first controller and a second controller. The switch array selects a battery module from multiple battery modules in a battery pack based upon a conduction state of the switch array. The first controller is coupled to the switch array and receives measurement information of cells in the battery pack through the switch array. The second controller is coupled to the switch array and the first controller and provides a control signal to control the conduction state of the switch array. The first controller further controls a balance circuit coupled to the battery pack to balance a selected battery module if the selected battery module is identified as an unbalanced battery module based upon measurement information associated with the selected battery module.

Figure 1:
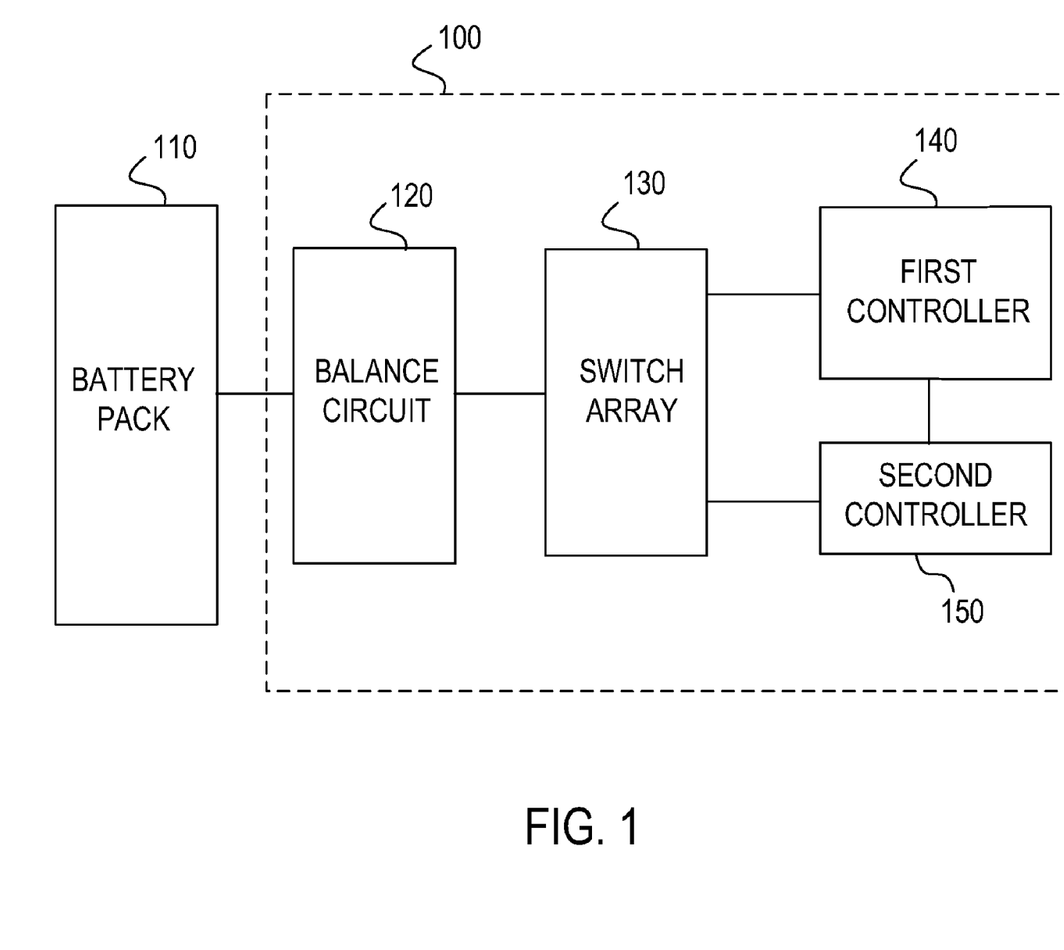
FIG. 1 is a block diagram of a battery management system according to one embodiment of the present invention.

FIG. 1 illustrates a block diagram of a battery management system 100 according to one embodiment of the present invention. A battery pack 110 in the battery management system 100 can be, but is not limited to, a Lithium-Ion battery or Lead-Acid battery. In one embodiment, the battery pack 110 includes multiple battery modules, each of which includes one or more cells. In the example of FIG. 1, the battery management system 100 includes a switch array 130 coupled to the battery pack 110, a first controller 140 coupled to the switch array 130, a second controller 150 coupled to both the first controller 140 and the switch array 130, and a balance circuit 120 coupled to the first controller 140. In the example of FIG. 1, the balanced circuit 120 is coupled to the first controller 140 through the switch array 130. Alternatively, the balance circuit 120 can be coupled to the first controller 140 directly and the switch array 130 is coupled to the first controller 140 through the balance circuit 120.

In one embodiment, the switch array 130 selects a battery module in the battery pack 110 to be coupled to the first controller 140 based upon a conduction state of the switch array. The first controller 140 receives measurement information of cells in the battery pack 110 through the switch array 130 and further provides the measurement information to the second controller 150. In one embodiment, the measurement information includes, but is not limited to, voltage information and temperature information. The second controller 150 provides a control signal to the switch array 130 to control the conduction state of the switch array 130, which in turn couples a corresponding battery module in the battery pack 110 to the first controller 140. As a battery module is selected, the first controller 140 can control the balance circuit 120 to balance the selected battery module if there is unbalance between cells in the selected battery module, that is, the selected battery module is identified as an unbalanced battery module based upon measurement information associated with the selected battery module. As such, balance of the battery pack 110 is achieved.

In one embodiment, the second controller 150 includes a timer for allocating time segments to the battery modules based upon the measurement information, e.g., for balancing one or more battery modules which are identified as unbalanced battery modules. As such, balance of the battery pack 110 can be accomplished more efficiently, which is described in relation to FIG. 3.

Because the first controller 140 balances multiple battery modules in the battery pack 110, e.g., in a sequential order, it is not necessary to allocate a respective controller to each battery module as the conventional approach does. As such, the cost of the battery management system in embodiments of the present invention is reduced.

Figure 2:
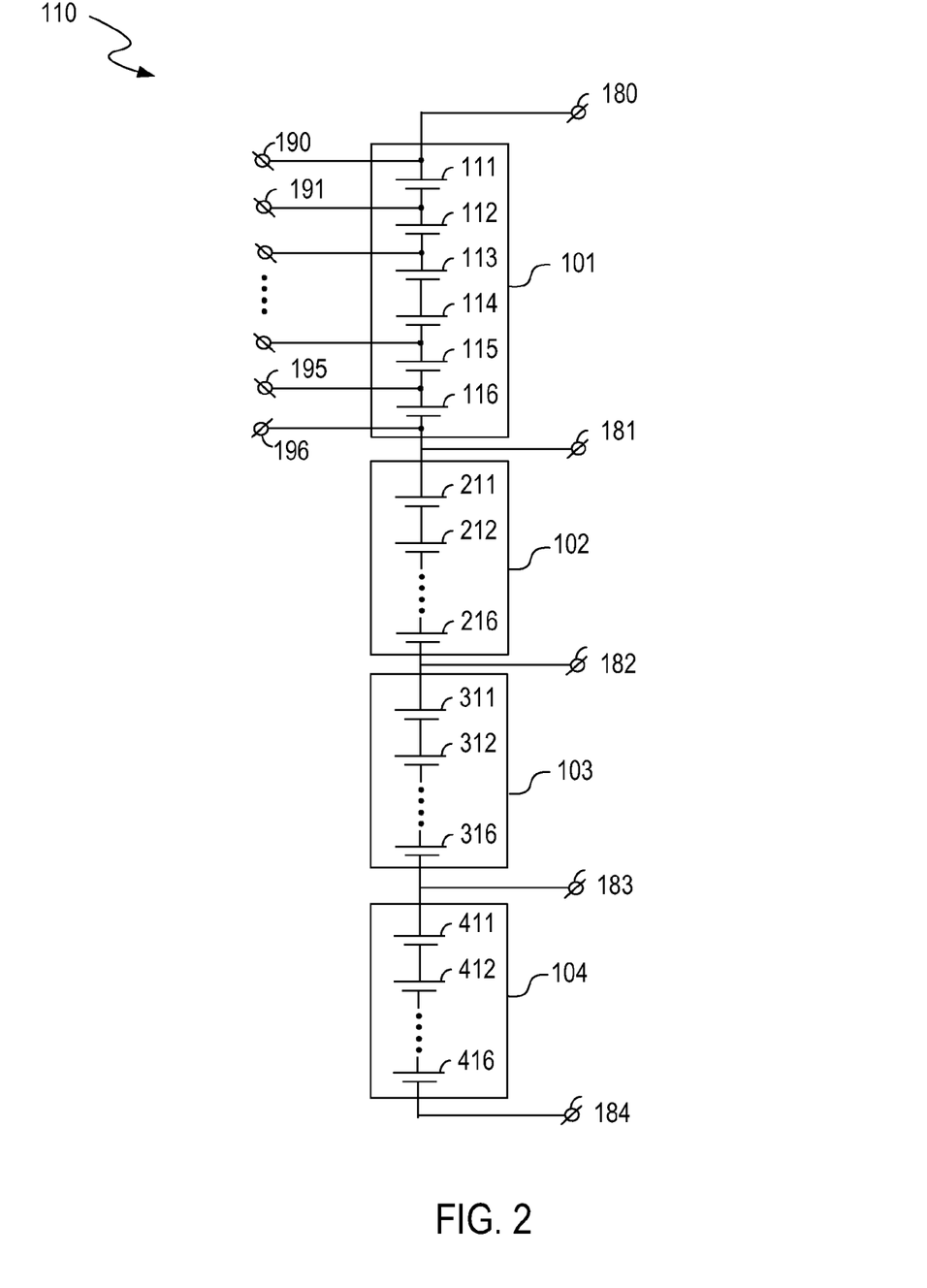
FIG. 2 is an example of the battery pack in FIG. 1 according to one embodiment of the present invention.

FIG. 2 illustrates an example of the battery pack 110 in FIG. 1 according to one embodiment of the present invention. As shown in FIG. 2, the battery pack 110 includes series-coupled battery modules 101 through 104. Each of the battery modules 101 through 104 includes multiple cells, e.g., cells 111, 112 through 116 in the battery module 101, cells 211, 212 through 216 in the battery module 102, cells 311, 312 through 316 in the battery module 103, cells 411, 412 through 416 in the battery module 104. Each cell has a positive electric terminal and a negative electric terminal. For example, the cells in a battery module have electric terminals 190, 191 through 196, where the electric terminal 190/196 can be coupled to a negative/positive module terminal of a neighboring battery module. With regard to the battery modules 101 through 104, module terminals include electric terminals 180 through 184, where the electric terminals 180 and 184 can be further used as positive and negative pack terminals, in the example of FIG. 2. By way of example, if a voltage of each cell is approximately 2V, a module voltage across each battery module is 12V. A battery module with six cells is shown in FIG. 2 for purposes of illustration but not limitation. The number of the battery modules and the number of cells within each battery module and can vary according to various applications.

Figure 3:
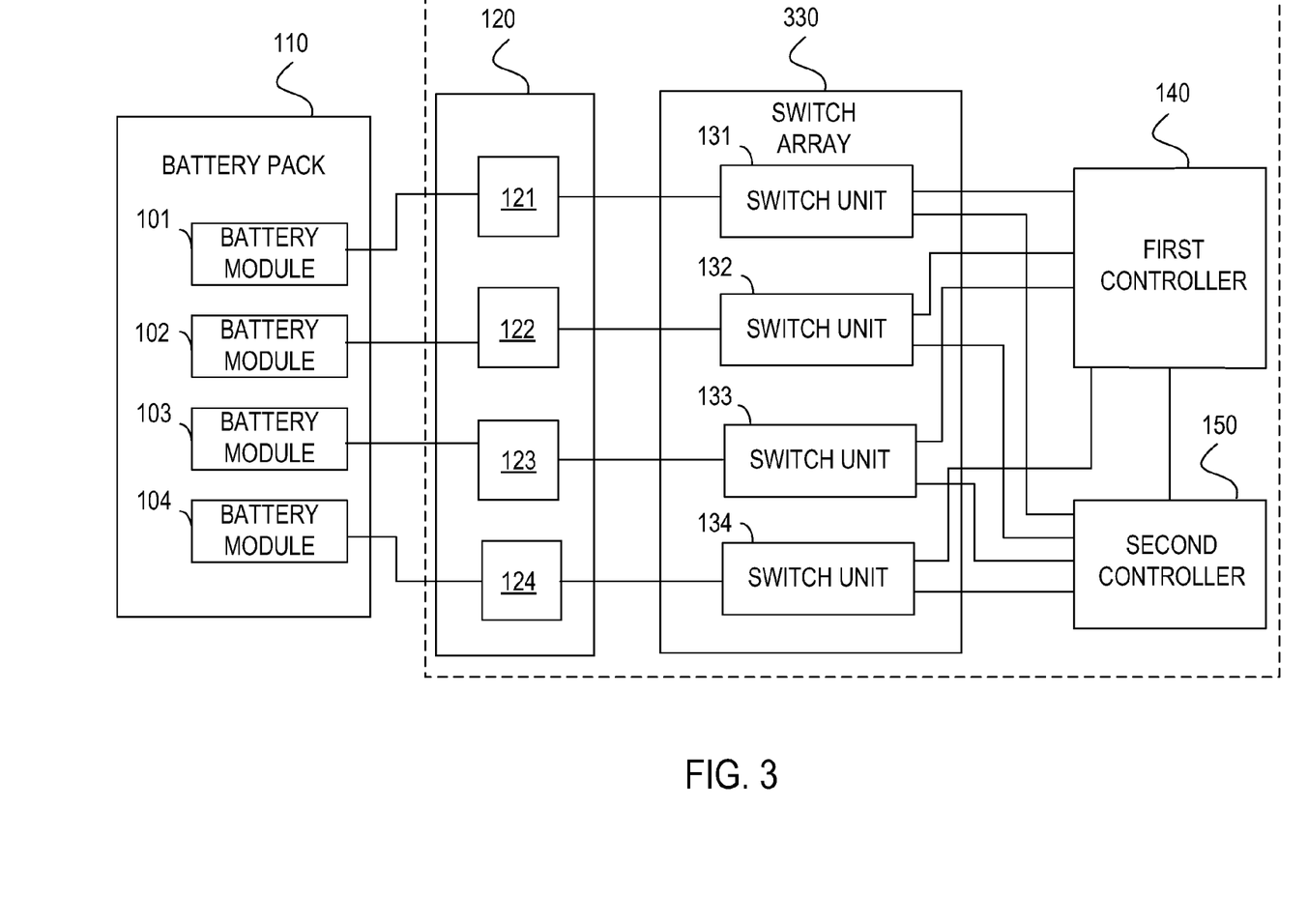
FIG. 3 is a bock diagram of a battery management system according to one embodiment of the present invention.

FIG. 3 is a block diagram of a battery management system 300 according to one embodiment of the present invention. Elements labeled the same as in FIGS. 1 and 2 have similar functions. In the example of FIG. 3, the balance circuit 120 includes multiple balance units 121 through 124, with each balance unit corresponding to one of the battery modules 101 through 104 in the battery pack 110. Each balance unit includes multiple balance sub-circuits, with each balance sub-circuit corresponding to one of the cells in the corresponding battery module, which is further described in relation to FIG. 5. Moreover, a switch array 330 coupled between the balance circuit 120 and the first controller 140 includes multiple switch units 131 through 134, with each switch unit corresponding to one of the battery modules 101 through 104 in the battery pack 110.

In one embodiment, the second controller 150 switches on one of the switch units 131 through 134 so that the battery module corresponding to the switch unit that is switched on is selected. For example, the switch units 131 through 133 are switched on sequentially in an initial scanning stage of the battery management system 300, such that voltages of cells in the battery modules 101 through 104 are sampled by the first controller 140. The cell-voltage information of the battery modules 101 through 104 is further sent from the first controller 140 to the second controller 150. Based on the cell-voltage information, the second controller 150 determines balance levels of the battery modules 101 through 104 and allocates time segments to the battery modules 101 through 104 respectively according to the balance levels, in one embodiment.

More specifically, based upon voltages of the cells in the battery pack 110, the first controller 140 calculates cell-voltage differences between cells in each battery module and determines whether there is unbalance within each battery module. In one embodiment, a battery module can be identified as an unbalanced battery module if a cell-voltage difference between any two cells in such battery module exceeds a predetermined threshold $V_{THM}$.

Furthermore, in one embodiment, the second controller 150 determines the balance levels of the battery modules 101 through 104 based upon the maximum cell-voltage difference for each battery module. For example, when the maximum cell-voltage difference for the battery module 102 is the largest among the maximum cell-voltage differences for the battery modules 101-104, the second controller 150 determines that the battery module 102 has the lowest balance level. In contrast, when the maximum voltage difference for the battery module 103 is the smallest among all maximum voltage differences, e.g., lower than the predetermined threshold $V_{THM}$, the second controller 150 determines that the battery module 103 has the highest balance level, e.g., balanced.

In one embodiment, the battery modules 101 through 104 are selected, e.g., sequentially, to be coupled to the first controller 140 in a balance cycle and a total balance time for a balance cycle is predetermined. Based upon the balance levels, the second controller 150 divides the total balance time into different time segments and allocates the different time segments to respective battery modules. For example, a battery module having the highest balance level is allocated with the time segment having the shortest duration, while a battery module having the lowest balance level is allocated with the time segment having the longest duration. In other words, the worse the balance level of a battery module, the more time the battery module is allocated. When a battery module has a sound balance level, e.g., balanced, the time segment allocated to the battery module is relatively short since no balance is needed for the balanced battery module. In one embodiment, in a balance cycle, the first controller 140 controls a corresponding balance unit to perform cell balancing on a corresponding battery module if such battery module is identified as an unbalanced battery module and then samples the updated cell-voltage information after the cell-balancing is performed during the allocated time segment for such battery module. In one embodiment, if the corresponding battery module is balanced (e.g., according to the cell-voltage information of the battery module sampled by the first controller during the previous balance cycle), then the first controller does not control the balance module to perform balance but samples the cell-voltage information of such battery module during the corresponding allocated time segment which is relatively short. As such, the balancing procedure is performed more efficiently. Accordingly, based upon the updated cell-voltage information, the second controller 150 can determine the time segment for each battery module in a next balance cycle if the battery pack 110 is still undergoing unbalanced condition.

Take the battery module 102 as an example. When the time segment for the battery module 102 in a balance cycle arrives, the second controller 150 switches on the switch unit 132 to couple the battery module 102 to the first controller 140. Based on the voltage information, the first controller 140 controls the balance unit 122 to balance the battery module 102 if the battery module 102 is identified as an unbalanced battery module and further samples the updated cell-voltage information of the battery module 102 after the cell-balancing is performed. If, however, the battery module 102 is balanced, then no cell balancing is performed by the balance unit 122 and the first controller samples the updated cell-voltage information of battery module 102. The updated cell-voltage information of battery module 102 can be used to determine the time segment for the battery module 102 in the next balance cycle. When the allocated time segment for the battery module 102 expires, the switch unit 132 is switched off and the switch unit 133 is switch on. As a result, the time segment for the battery module 102 terminates and the time segment for the next battery module, e.g., battery module 103, follows.

Because the battery modules having different balance levels are allocated with different time segments for the balancing, each balance cycle is performed in a more efficient way. As such, the balance efficiency of the battery management system 300 is enhanced.

Figure 4:
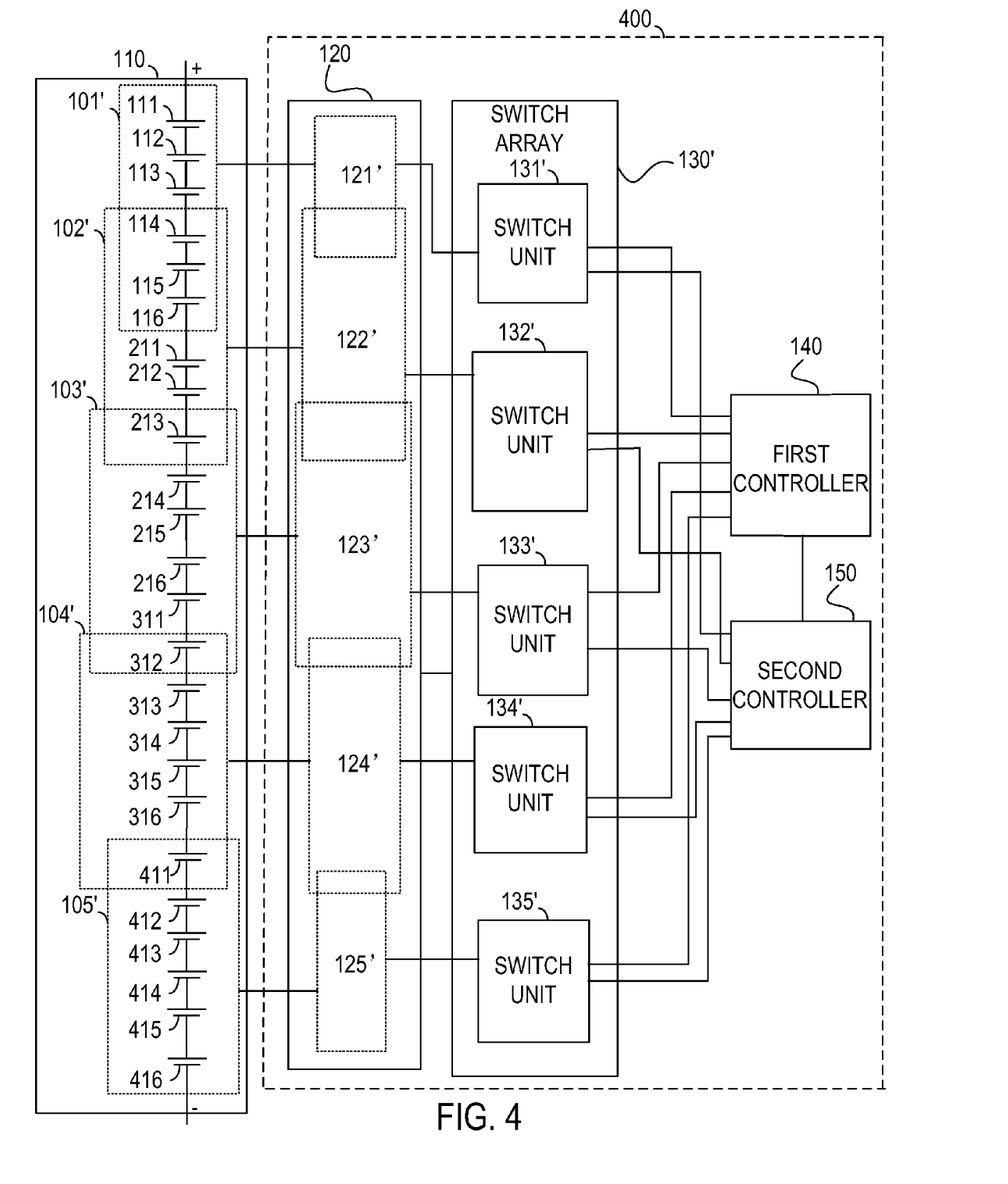
FIG. 4 is a block diagram of a battery management system according to another embodiment of the present invention.

FIG. 4 illustrates a block diagram of a battery management system 400 according to another embodiment of the present invention. Elements labeled the same as in FIGS. 1-3 have similar functions. Different from the battery management system 300 in FIG. 3, the cells in the battery pack 110 are divided into overlapping battery modules 101' through 105'. For example, neighboring battery modules share one or more cells, which are herein referred to as overlap cells. In a similar manner, the balance sub-circuits in the balance circuit 120 are grouped into overlapping balance units 121' through 125', with each balance unit corresponding to one of the overlapping battery modules 101' through 105'. Moreover, a switch array 130' including switch units 131' through 135' is used for selecting one of the overlapping battery modules 101' through 105'.

The battery management system 400 operates in a similar way as discussed in relation to FIG. 3, but the battery management system 400 further uses a cell voltage of an overlap cell as a reference voltage to achieve balance between different battery modules in the battery pack 110. For example, when the battery module 101' is balanced, the cell voltages of overlap cells 114 through 116 are used as the reference voltage when balancing the battery module 102'. As such, when balance for the battery module 102' is done, the balance between the neighboring battery modules 101' and 102' is achieved accordingly.

Figure 5:
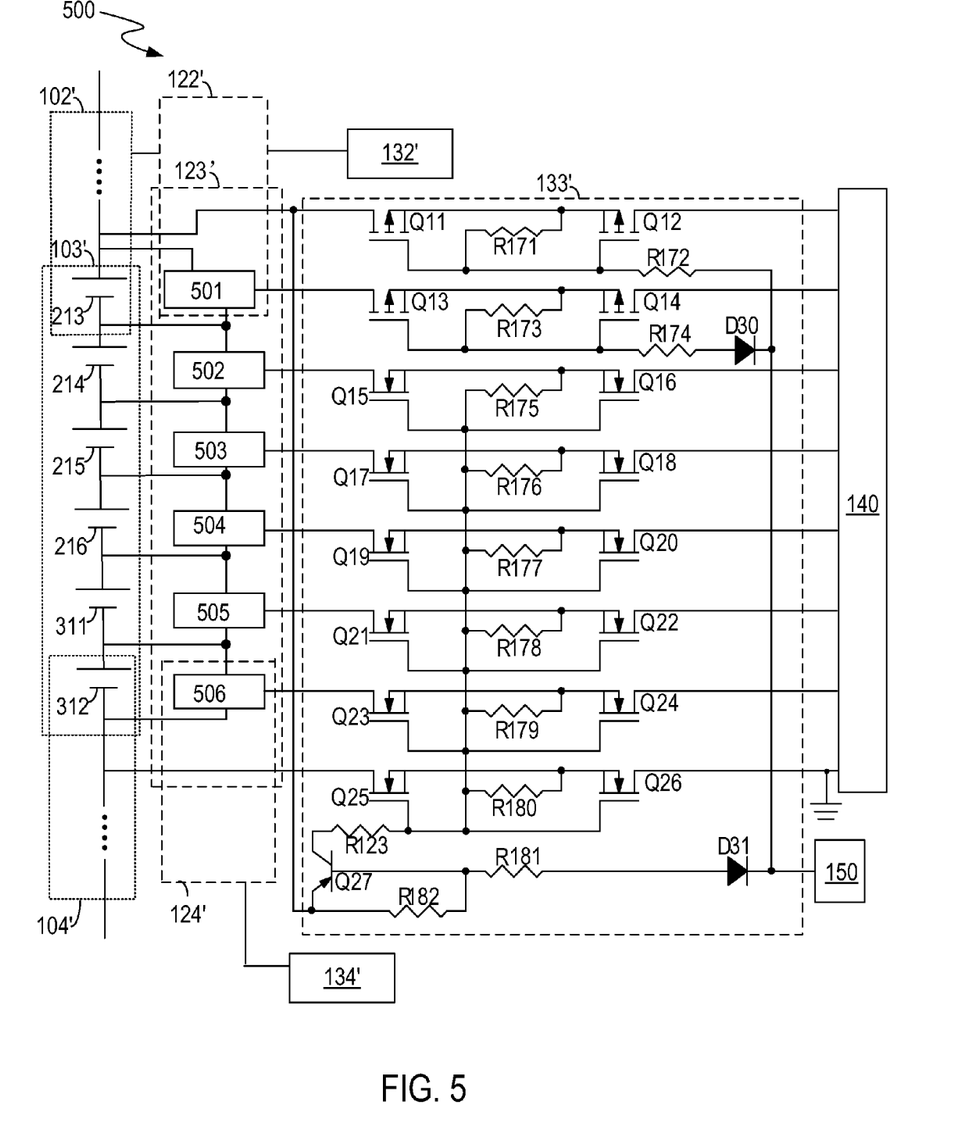
FIG. 5 is a schematic diagram of a battery management circuit for a battery module in FIG. 4 according to one embodiment of the present invention.

FIG. 5 shows an example of a schematic diagram of a battery management circuit 500 for managing the battery module 103' in FIG. 4 according to one embodiment of the present invention. Elements labeled the same as in FIGS. 3 and 4 have similar functions. In the example of FIG. 5, the battery management circuit 500 includes the balance unit 123', the switch unit 133', the first controller 140 and the second controller 150. The balance unit 123' further includes balance sub-circuits 501 through 506 for balancing the cells 213 through 216, and 311 and 312 respectively. The switch unit 133' includes transistors Q11 through Q27, resistors 181 through 182, and diodes D30 and D31. The battery management circuit for each battery module in FIGS. 3 and 4 can be similar to the battery management circuit 500.

In one embodiment, the switch unit 133' is switched on and off by the control signal from the second controller 150. More specifically, the transistor Q27 is coupled to the second controller 150 and is switched on and off by the control signal from the second controller 150. In one embodiment, the emitter of the transistor Q27 is coupled to the positive module terminal (the positive electric terminal of the cell 213), the base of the transistor Q27 is coupled to a terminal (e.g., Input/output terminal) of the second controller 150 through series-coupled resistor R181 and diode D31, and the collector of the transistor Q27 is coupled to series-coupled resistors R173 through R180 and R123. The resistor R182 is coupled between the base and emitter of the transistor Q27. When the control signal from the second controller 150 has a low voltage (logic 0), a voltage across the resistor R182 is produced to switch on the transistor Q27. When the control signal has a high voltage (logic 1), no voltage is produced across the resistor R182 and therefore the transistor Q27 is switched off.

The transistors Q13 through Q24 are coupled between the cells in the battery module 103' and the first controller 140. When the transistors Q13 through Q24 are switched on, the cell voltages of the cells in the battery module 103' are passed to the first controller 140 through these transistors. In one embodiment, the transistors Q13 through Q24 are grouped into multiple transistor sets, with each transistor set coupled between one of the cells and the first controller 140. In the example of FIG. 5, the transistor set of the transistors Q13 and Q14 are P-type metal-oxide-semiconductor (PMOS) transistors. The remaining transistor sets, e.g., transistors Q15 through Q24, are N-type metal-oxide-semiconductor (NMOS) transistors.

With regard to the PMOS transistors Q13 and Q14, the drain of the transistor Q13 is coupled to the balance sub-circuit 501, and the drain of the transistor Q14 is coupled to the first controller 140. Furthermore, the gates of the transistors Q13 and Q14 are coupled together to the terminal of the second controller 150 through series-coupled resistor R174 and diode D30, and the sources of the transistors Q13 and Q14 are coupled together to the gates through the resistor R173. In one embodiment, when the control signal from the second controller 150 is logic 1, no voltage is produced across the resistor R173 and therefore the transistors Q13 and Q14 are switched off. When the control signal from the second controller 150 is logic 0, a voltage is produced across resistor R173 and therefore the transistors Q13 and Q14 are switched on.

With regard to the NMOS transistor sets, e.g., Q15 and Q16, the drain of the transistor Q15 is coupled to the balance sub-circuit 502, and the drain of the transistor Q14 is coupled to the first controller 140. Furthermore, the gates of the transistors Q15 and Q16 are coupled together, and the sources of transistors the Q15 and Q16 are coupled together to the gates through resistor R175. When transistor Q27 is switched on by the control signal from the second controller 150, a voltage across the resistor R175 is produced to switch on the transistors Q15 and Q16 accordingly. When the transistor Q27 is switched off by the control signal from the second controller 150, no voltage is produced across the resistor R175, and the transistors Q15 and Q16 are switched off accordingly. Transistor sets including Q17 through Q24 have a similar connection and operation as the transistor set including Q15 and Q16.

The transistors Q11 and Q12 are coupled to a power terminal of the first controller 140, and are also coupled to the positive module terminal of the battery module 103' (the positive electric terminal of the cell 213). The transistors Q25 and Q26 are coupled to a ground terminal of the first controller 140, and are also coupled to a negative module terminal of the battery module 103' (the negative electric terminal of the cell 312). When the transistors Q11, Q12, Q25, and Q26 are switched on, the module voltage across the battery module 103' is applied to the power terminal of the first controller 140. In the example of FIG. 5, the transistors Q11 and Q12 are PMOS transistors and have a similar connection and operation as the transistor set including Q13 and Q14. The transistors Q25 and Q26 are NMOS transistors and have a similar connection and operation as the transistor set including Q15 and Q16.

Accordingly, the transistors Q11 through Q27 can be divided into three categories. The first category including the transistors Q11, Q12, Q25 and Q26 is referred to as a power path switch for providing a power path. When the power path is conductive, the first controller 140 is powered by the module voltage across the battery module 103', which is applied to the power terminal of the controller 140 through the power path. The second category including transistors Q13 through Q24 is referred to as a cell path switch for providing a path to pass the cell voltages to the first controller 140. The third category including transistor Q27 is referred to as a control switch that is controlled by the second controller 150 to determine conduction states of other switches, e.g., the cell path switches, at least in part. Moreover, FIG. 5 shows one example of the switch unit 133'. Transistors included in the switch unit can have different number, structure and wiring connection, as long as the first controller 140 can be powered on by the selected battery module and cell voltages of the selected battery module can be sampled by the first controller 140.

In one embodiment, when the cell path switch is switched on, the first controller 140 controls the balance sub-circuits 501 through 506 in the balance unit 123' to balance the cells in the battery module 103', respectively. For example, when the cell 214 is to be balanced, the first controller 140 controls the balance sub-circuit 502 to perform cell balancing.

Moreover, after the battery module 103' is balanced by the balance unit 123', the time segment for the next battery module, e.g., the battery module 104', arrives. The voltage of the overlap cell 312 is used as the reference voltage when performing balance on the battery module 104'. As such, the remaining cells 313 through 316 and 411 are balanced to the reference voltage when the balance for the battery module 104' completes, and therefore the balance between neighboring battery modules 103' and 104' is also achieved. Consequently, the multiple battery modules in the battery pack 110 are balanced accordingly.

Figure 6:
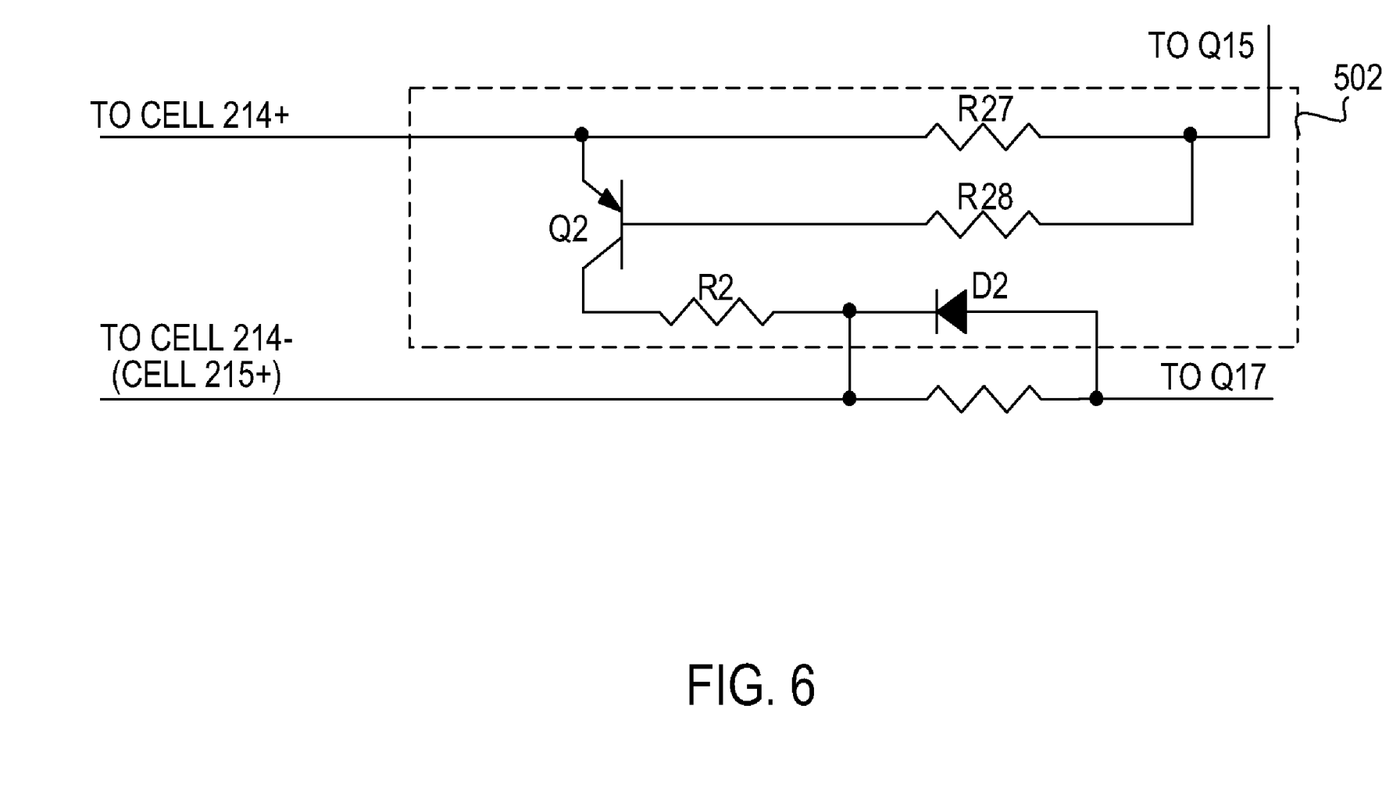
FIG. 6 is a schematic diagram of a balance sub-circuit in FIG. 5 according to one embodiment of the present invention.

FIG. 6 illustrates an example of a schematic diagram of the balance sub-circuit 502 according to one embodiment of the present invention. In one embodiment, the balance sub-circuit 502 coupled between the cell 214 and the switch unit 133' includes series-coupled resistor R2 and transistor Q2. The emitter of the transistor Q2 is coupled to the positive electric terminal of the cell 214 and is further coupled to the transistor Q15 in the switch unit 133' through resistor R27. The collector of the transistor Q2 is coupled to one terminal of resistor R2, and the base of the transistor Q2 is coupled to the transistor Q15 in the switch unit 133' through resistor R28. The other terminal of the resistor R27 is coupled to the negative electric terminal of the cell 214. When the transistors Q15 and Q16 are switched on, the first controller 140 controls the transistor Q2 to be switched on if the cell 214 is to be balanced. More specifically, the first controller 140 enables a current to flow through the resistor R27 to switch on the transistor Q2 when the cell 214 is to be balanced, e.g., due to a relatively cell high voltage. When the transistor Q2 is switched on, the cell 214 discharges through the transistor Q2 and resistor R2, such that the voltage of the cell 214 is reduced to be balanced with other cells in the battery module 103'.

In one embodiment, the balance sub-circuit 502 further includes a diode D2. A cathode of the diode D2 is coupled to the resistor R2, and is also coupled to the negative electric terminal of the cell 214. An anode of the diode D2 is coupled to the transistor Q17. By using the diode D2, the collector of the transistor Q2 is clamped to a relatively high voltage, such that a relatively low current from the first controller 140 can switch the transistor Q2 off. As such, a relatively cheap transistor Q2 can be used together with the diode D2 to achieve the balance function.

Figure 7:
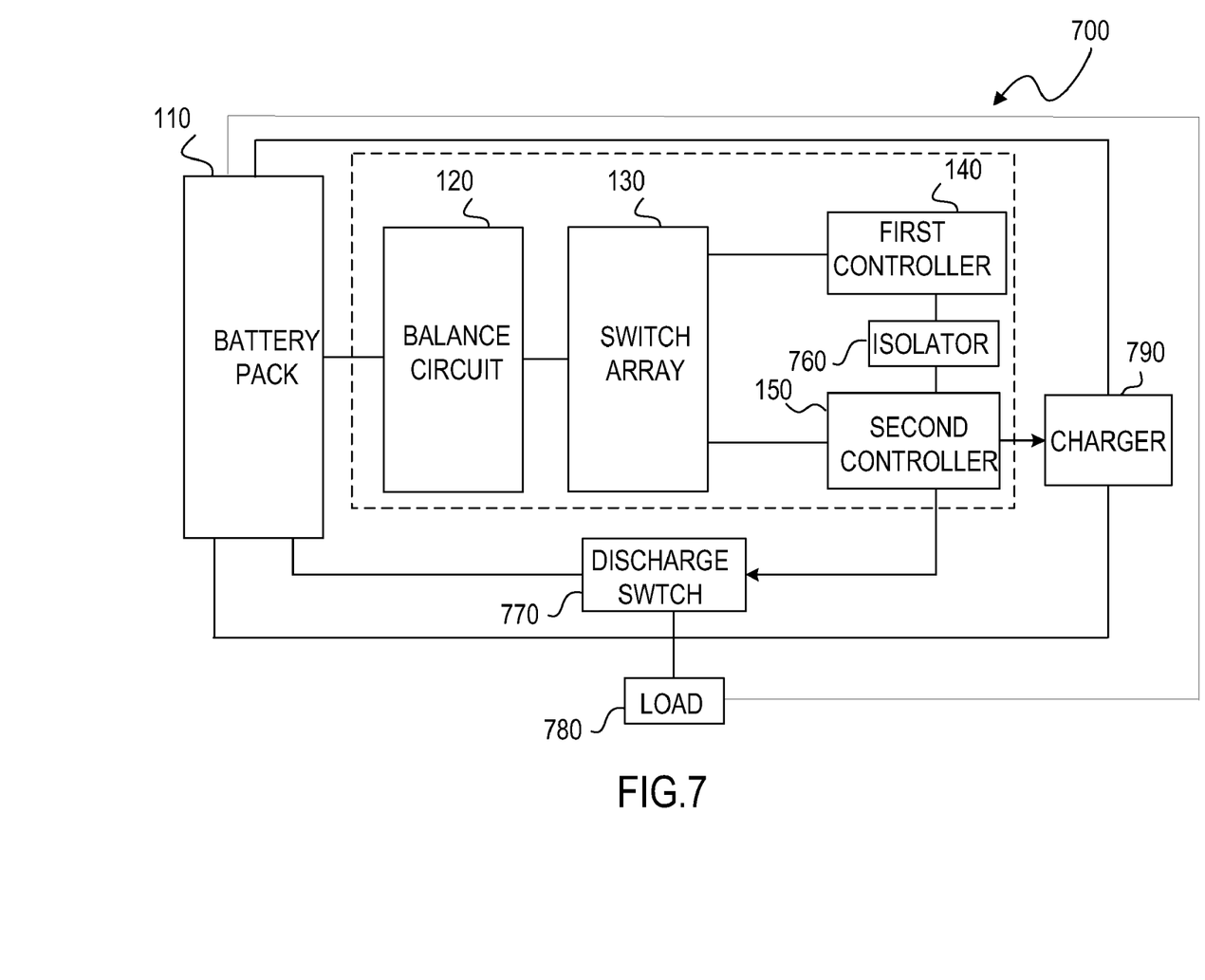
FIG. 7 is a block diagram of a battery management system according to another embodiment of the present invention.

FIG. 7 illustrates a block diagram of a battery management system 700 according to another embodiment of the present invention. Elements labeled the same as in FIGS. 1-6 have similar functions. Specifically, the balance circuit 120, the switch array 130, the first controller 140 and the second controller 150 can have similar structures as illustrated in FIGS. 1-6.

The battery management system 700 further includes a charger 790 coupled between the positive pack terminal and the negative pack terminal of the battery pack 110. The charger 790 charges the battery pack 110 under control of the second controller 150. Moreover, the battery management system 700 further includes a discharge switch 770. One terminal of the discharge switch 770 is coupled to the negative pack terminal of the battery pack 110, and a load 780 is coupled between another terminal of the discharge switch 770 and the positive pack terminal of the battery pack 110. The discharge switch 770 controls the discharging of the battery pack 110 under control of the second controller 150. In one embodiment, the discharge switch 770 comprises a metal-oxide-semiconductor-field-effect-transistor (MOSFET). When the first controller 140 detects that the battery pack 110 is undergoing an abnormal state, the first controller 140 instructs the second controller 150 to enable a protective measure accordingly. As such, the battery pack 110 is protected from being damaged due to abnormal or undesired conditions.

The abnormal state includes, but is not limited to, over-voltage (OV) state, under-voltage (UV) state, and over-temperature (OT) state. When the battery pack 110 is undergoing the abnormal state, the first controller 140 obtains measurement information of the battery pack 110 and generates an alert signal based upon the measurement information. The alert signal is further sent to the second controller 150, which enables the protective measure based upon the alert signal.

For example, when the battery pack 110 is undergoing the OV state, the second controller 150 instructs the charger 790 to terminate the charging process. When the battery pack 110 is undergoing the UV state, the second controller 150 switches off the discharge switch 770 to terminate the discharging process. In one embodiment, the second controller 150 further instructs the charger 790 to start the charging process. When the battery pack 110 is undergoing the OT state, the second controller 150 conducts thermal compensation based upon different battery temperatures. For example, the balance circuit 120 can be controlled to perform protective procedures, e.g., to reduce the charging or discharging currents of cells experiencing a high temperature, and even to terminate the charging and discharging process of these cells. In one embodiment, when the abnormal state happens to multiple cells, the second controller 150 is capable of controlling the balance circuit 120 to perform the protective procedures on the multiple cells simultaneously. As such, the battery management system 700 has an enhanced efficiency in managing the battery pack 110.

The second controller 150 receives data from the first controller 140 and processes these data. These data includes, but is not limited to, the cell voltage, the temperature, and the alert signal indicative of the abnormal state. In one embodiment, the second controller 150 displays these data and/or sends these data to a device for further processing.

In one embodiment, the battery management system 700 includes an isolator 760 coupled between the first controller 140 and the second controller 150. The first controller 140 is electrically isolated from the second controller 150 via the isolator 760.

Figure 8:
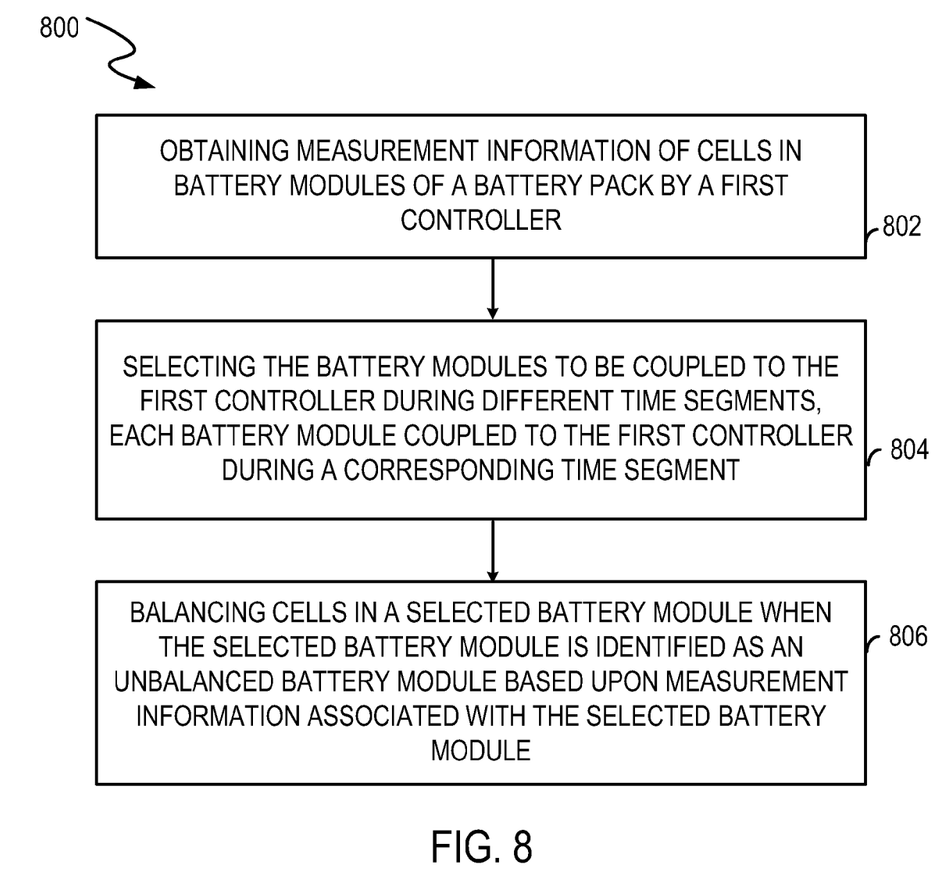
FIG. 8 is a flowchart of a method for managing a battery pack according to one embodiment of the present invention.

FIG. 8 illustrates a flowchart 800 of a method for managing a battery pack according to one embodiment of the present invention. In one embodiment, the battery management system 700 operates in accordance with the flowchart 800 to manage the battery pack 110. The battery pack 110 includes a plurality of battery modules and each battery module further includes one or more cells. FIG. 8 is described in combination with FIGS. 3, 4 and 7. Although specific steps are disclosed in FIG. 8, such steps are examples. That is, the present invention is well suited to performing various other steps or variations of the steps recited in FIG. 8.

In block 802, a first controller obtains measurement information, e.g., cell voltages and/or temperatures, of cells in battery modules of a battery pack. For example, the first controller 140 obtains measurement information of the cells in battery modules 101 through 104 of the battery pack 110 at an initial scanning stage. Furthermore, the first controller 140 can obtain the updated measurement information of the cells in the battery modules 101 through 104 in a balance cycle. Thus, based on the measurement information, the balance levels of the battery modules 101 through 104 can be determined.

In block 804, in a balance cycle, a battery module in the battery pack is selected to be coupled to (e.g., electrically coupled to) the first controller during a corresponding time segment. Different battery modules are coupled to the first controller during different time segments. In one embodiment, the battery modules 101 through 104 are electrically coupled to the first controller 140 when the corresponding switch units 131 through 134 are switched on during different time segments. Furthermore, the different time segments are determined by the balance levels of the battery modules 101 through 104.

In block 806, the cells in the selected battery module are balanced when the selected battery module is identified as an unbalanced battery module based upon the measurement information associated with the selected battery module. In one embodiment, a battery module is unbalanced when a cell-voltage difference in a selected battery module exceeds the predetermined threshold $V_{THM}$. In this instance, the corresponding balance unit performs cell balancing to the selected battery module.

Figure 9:
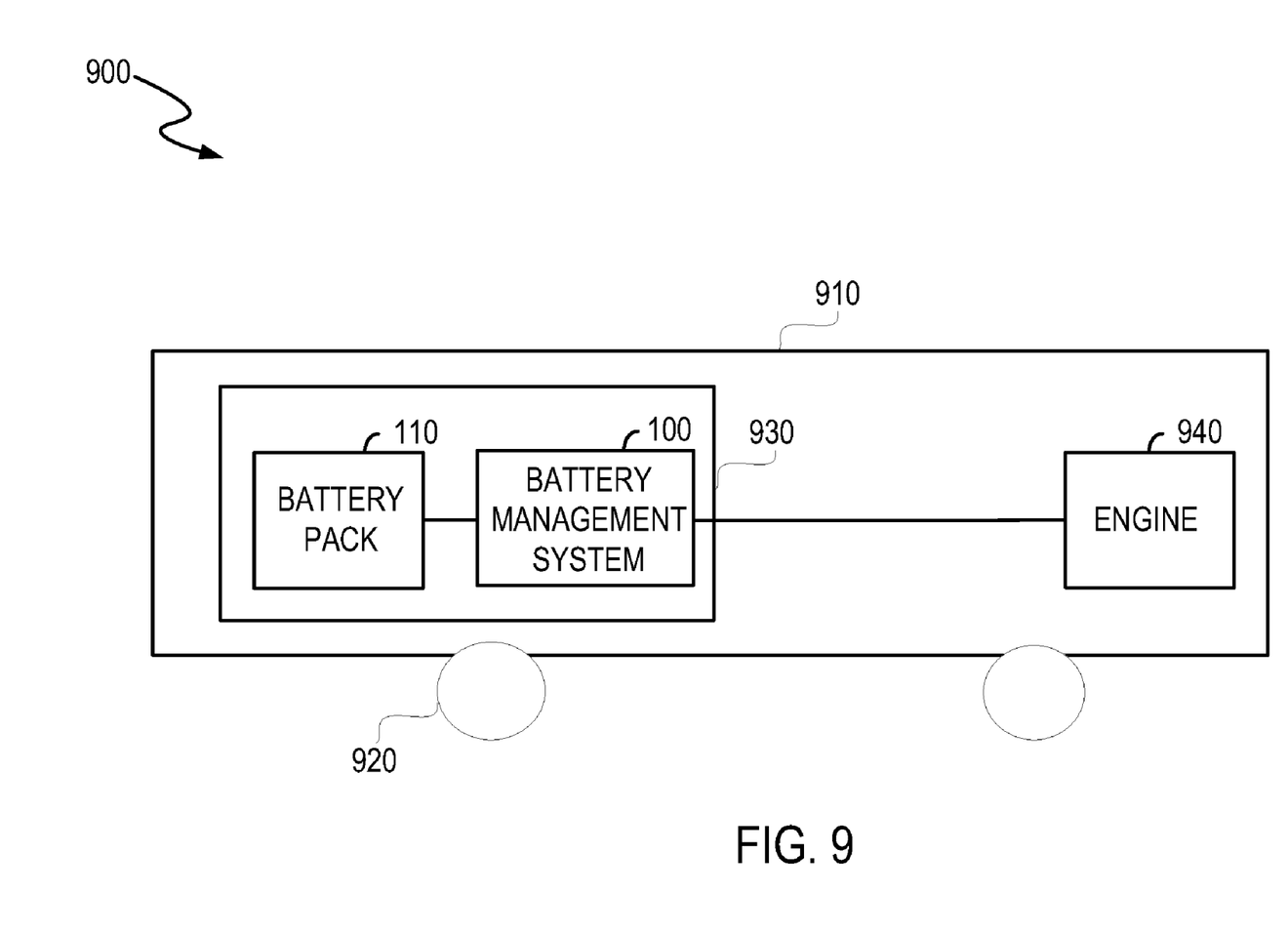
FIG. 9 is an electric vehicle having a battery management system according to one embodiment of the present invention.

FIG. 9 illustrates an electric vehicle 900 according to one embodiment of the present invention. Elements labeled the same as in FIG. 1 have similar functions. In one embodiment, the electric vehicle 900 includes a vehicle body 910, multiple wheels 920, a battery system 930, and an engine 940. The vehicle body 910 accommodates the battery system 930 and the engine 940. The battery system 930 includes the battery pack 110 and the battery management system 100 (or the battery management 300 or 400). The battery system 930 provides electric power to the engine 940, and the engine 940 coupled to the battery system 930 further converts the electric power to motion energy to propel the wheels, such that the electric vehicle 900 moves.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. A battery management system comprising:
a switch array for selecting a battery module from a plurality of battery modules in a battery pack based upon a conduction state of said switch array, wherein each battery module of said battery modules comprises a plurality of cells; and
a first controller coupled to said switch array and for receiving measurement information of cells in the selected battery module through said switch array; and
a second controller coupled to said switch array and said first controller and for providing a control signal to control said conduction state of said switch array, determining a balance level of said selected battery module based upon said measurement information, and allocating a time segment to said selected battery module based upon said balance level, wherein a duration of said time segment is determined according to said balance level,
wherein said first controller further controls a balance circuit coupled to said battery pack to balance said selected battery module during said time segment if said selected battery module is identified as an unbalanced battery module by said second controller.

2. The battery management system of claim 1, wherein said switch array comprises a plurality of switch units corresponding to said battery modules, and wherein each of said switch units comprises a cell path switch and a power path switch.

3. The battery management system of claim 2, wherein a cell path switch of a corresponding switch unit of said switch units is coupled between said cells in said selected battery module and said first controller and for passing cell voltages of said cells in said selected battery module to said first controller.

4. The battery management system of claim 2, wherein a power path switch of a corresponding switch unit of said switch units is coupled to a power terminal of said first controller and for applying a module voltage across said selected battery module to said first controller.

5. The battery management system of claim 2, wherein said each of said switch units further comprises a control switch coupled to said second controller, wherein said control signal determines a conduction state of said control switch, and wherein said conduction state of said control switch determines a conduction state of said cell path switch, at least in part.

6. The battery management system of claim 1, wherein neighboring battery modules in said battery pack share an overlap cell.

7. The battery management system of claim 6, wherein a voltage of said overlap cell is used as a reference voltage to achieve balance between said neighboring battery modules.

8. The battery management system of claim 1, further comprising:
a charger coupled to said second controller and said battery pack, wherein said second controller controls said charger based upon measurement information of cells in said battery packs.

9. The battery management system of claim 1, further comprising:
a discharge switch coupled to said second controller and said battery pack, wherein said second controller controls a conduction state of said discharge switch based upon measurement information of cells in said battery packs.

10. The battery management system of claim 1, wherein said balance circuit comprises a plurality of balance units, wherein said balance units each corresponds to one of said battery modules, and wherein said first controller controls a corresponding balance unit to perform cell balancing for said unbalanced battery module.

11. A method for managing a battery pack comprising a plurality of battery modules, said method comprising:
obtaining measurement information of cells in said plurality of battery modules of said battery pack by a first controller, wherein each battery module of said battery modules comprises a plurality of cells;
selecting a battery module from said plurality of battery modules;
electrically coupling the selected battery module to said first controller during a time segment, wherein a duration of said time segment is determined based on said measurement information; and
balancing cells in said selected battery module when said selected battery module is identified as an unbalanced battery module based upon said measurement information.

12. The method of claim 11, further comprising:
determining balance levels of said plurality of battery modules based upon said measurement information; and
allocating a plurality of time segments to said plurality of battery modules based upon said balance levels.

13. The method of claim 11, further comprising:
sharing an overlap cell by neighboring battery modules among said plurality of battery modules; and
using a voltage of said overlap cell as a reference voltage to balance said neighboring battery modules.

14. The method of claim 11, further comprising:
powering on said first controller by a module voltage across said selected battery module.

15. The method of claim 11, further comprising:
identifying an abnormal state of said battery pack based upon said measurement information, wherein said abnormal state is selected from the group consisting of an over-voltage state, an under-voltage state, and an over-temperature state.

16. A vehicle comprising:
a battery system for providing electric power;
an engine coupled to said battery system and for converting said electric power to motion energy;
a vehicle body for accommodating said battery system and said engine; and
a plurality of wheels underneath said vehicle body and for moving said electric vehicle when propelled by said motion energy from said engine,
wherein said battery system comprises:
a battery pack;
a switch array for selecting a battery module of a plurality of battery modules in said battery pack based upon a conduction state of said switch array, wherein each battery module of said battery modules comprises a plurality of cells; and
a first controller coupled to said switch array and for receiving measurement information of cells in the selected battery module through said switch array; and
a second controller coupled to said switch array and said first controller and for providing a control signal to control said conduction state of said switch array, determining a balance level of said selected battery module based upon said measurement information, and allocating a time segment to said selected battery module based upon said balance level, wherein a duration of said time segment is determined according to said balance level,
wherein said first controller further controls a balance circuit coupled to said battery pack to balance said selected battery module during said time segment if said selected battery module is identified as an unbalanced battery module by said second controller.

17. The battery management system of claim 1, wherein a duration of a first time segment allocated to a first battery module of said battery modules is longer than a duration of a second time segment allocated to a second battery module of said battery modules if a balance level of said first battery module is lower than a balance level of said second battery module.

18. The battery management system of claim 1, wherein said first controller further receives updated measurement information of said cells after balancing said selected battery module.

19. The battery management system of claim 1, wherein said second controller determines balance levels of said battery modules based upon a maximum cell-voltage difference in said each battery module of said battery modules.

20. The battery management system of claim 19, wherein a balance level of a first battery module of said battery modules is lower than a balance level of a second battery module of said battery modules if a maximum cell-voltage difference of said first battery module is greater than a maximum cell-voltage difference of said second battery module.

* * * * *